United States Patent [19]
Sassa

[11] Patent Number: 5,549,966
[45] Date of Patent: Aug. 27, 1996

[54] FABRIC OF COMMINGLED FIBERGLASS AND POLYTETRAFLUOROETHYLENE

[75] Inventor: Robert L. Sassa, Newark, Del.

[73] Assignee: W. L. Gore & Associates, Inc., Newark, Del.

[21] Appl. No.: 307,539

[22] Filed: Sep. 16, 1994

Related U.S. Application Data

[62] Division of Ser. No. 33,678, Mar. 16, 1993, abandoned.

[51] Int. Cl.$^6$ .................................................. D03D 3/00
[52] U.S. Cl. ........................... 428/229; 55/361; 55/527; 57/908; 428/225; 428/257; 428/421; 428/422
[58] Field of Search .................................. 428/288, 225, 428/257, 421, 422, 229; 57/908; 55/361, 527

[56] References Cited

U.S. PATENT DOCUMENTS

| | | | |
|---|---|---|---|
| 3,073,005 | 12/1957 | Tiede | 28/82 |
| 3,438,841 | 3/1965 | Zumeta et al. | 161/47 |
| 3,815,468 | 6/1974 | Matt et al. | 87/1 |
| 3,953,566 | 4/1976 | Gore | 264/288 |
| 4,026,863 | 5/1977 | Iseki et al. | 260/42.14 |
| 4,362,069 | 12/1982 | Giatras et al. | 74/501 P |
| 4,612,237 | 9/1986 | Frankenburg | 428/219 |
| 4,840,838 | 6/1989 | Wyss | 428/234 |
| 4,975,321 | 12/1990 | Gentile et al. | 428/294 |
| 4,985,296 | 1/1991 | Mortimer, Jr. | 428/220 |
| 5,188,892 | 2/1993 | Grindstaff | 428/59 |
| 5,206,085 | 4/1993 | Nakagawa et al. | 428/372 |

FOREIGN PATENT DOCUMENTS

| | | |
|---|---|---|
| 0066414 | 12/1982 | European Pat. Off. . |
| 0226471 | 6/1987 | European Pat. Off. . |
| 0358222 | 3/1990 | European Pat. Off. . |

*Primary Examiner*—James J. Bell
*Attorney, Agent, or Firm*—David J. Johns

[57] ABSTRACT

An improved composite fiber of fiberglass and polytetrafluoroethylene (PTFE) is provided. The composite fiber comprises a coherent strand of commingled filaments of fiberglass and PTFE which is far more resistant to flex, abrasion, and chemical attack than previous fiberglass fibers. Preferably filaments of expanded PTFE tow yarn and filaments of PTFE are combined through a process of air-jet texturing. The fibers of the present invention have a wide range of possible uses, including being formed into a fabric and employed as filter media.

5 Claims, 5 Drawing Sheets

FABRIC OF COMMINGLED FIBERGLASS AND POLYTETRAFLUOROETHYLENE

RELATED APPLICATIONS

The present application is a division of U.S. patent application Ser. No. 08/033,678 filed Mar. 16, 1993 now abandoned.

BACKGROUND OF THE INVENTION

1. Field of the Invention

The present invention relates to improved composite fibers and fabrics and methods for producing them. More particularly, the present invention relates to an improved composite textile of fiberglass and polytetrafluoroethylene (PTFE).

2. Description of Related Art

Fiberglass textiles are widely employed today in numerous applications. This is due to the many favorable properties of fiberglass, including relatively low cost, excellent mechanical strength, dimensional stability, good insulative properties, and excellent resistance to temperature and humidity. Among the popular present uses of fiberglass are as an architectural fabric, in the electronics industry (e.g. as a printed circuit board), as a filtration media, and as a structural composite.

Due mostly to its relatively low cost, fiberglass presently dominates the high temperature filtration market (typically defined as those filters operating within 300° to 500° F.). In this regard, fiberglass often costs 33 to 95% less than some competitive synthetic textile fibers (e.g. polytetraethylene, aramids, polyphenylene sulfide, polyimides and copolyimides).

Although fiberglass performs adequately in these applications, it suffers from numerous deficiencies. Perhaps the greatest problem with fiberglass is that it is quite fragile—being easily damaged when flexed or abraded. As a result, fiberglass fabric is incapable of performing in many applications. For instance, where a filter must be vigorously flexed to free filtrate and clean the filter media (e.g. in a "shaker"-type bag house filter or a pulse-jet bag house filter), a fiberglass fabric will quickly fail. Even under less demanding regenerative procedures (e.g. reverse air cleaned bags), where far less bag flex is encountered, fiberglass has relatively limited operational life.

Another deficiency of fiberglass is that it is subject to certain chemical attack. Chemicals attack the glass filaments in the textile primarily when the process gas phase goes through a dewpoint excursion. Chemical attack can also occur in the gaseous phase or when solid particulate contacts the fiberglass.

In an effort to address some of the problems of chemical attack, a number of finishes and protective coatings have been developed. Examples of such treatments include constituents of silicone oils, graphite and PTFE dispersion coatings. Although such treatments have proven relatively effective at protecting fiberglass from chemical attack, they do not improve the problem of flex failure.

Another common problem with fiberglass is that it is difficult to handle and work. By way of example, if the fiberglass is not carefully handled during a weaving process, the low abrasion resistance of the fiberglass often leads to friction damage to the glass fibrils. Likewise, abrasion caused by weaving equipment can result in surface imperfections (e.g. glass pills) which can cause problems in later processing. Further, even a single fold in the glass material during processing can lead to fatigue and later failure.

In light of these many problems, synthetic fibers are the fibers of choice where long filter life is needed and/or extreme operative conditions are expected. Unfortunately, the costs of synthetic fibers restrict their accepted uses. Additionally, certain synthetic fibers, while having many exceptional characteristics, are also limited in certain respects. For example, PTFE tends to have stability (creep) problems in reverse air bag houses, with tension on the bag elongating it to a point at which proper cleaning and flexure does not occur. Copolyimides and aramids hydrolyze in the presence of moisture and high temperatures. Polyphenylene sulfide oxidizes and embrittles when exposed to oxygen and high temperature.

Accordingly, it is a primary purpose of the present invention to provide an improved fiber composite which retains many of the desirable properties of fiberglass, but which is far more resilient to flex, abrasion, and chemical attack.

It is a further purpose of the present invention to provide a fiberglass composite material which can be thoroughly handled and worked without fear of compromising its structural integrity.

It is another purpose of the present invention to provide a relatively low-cost composite material which has many of the desired properties of existing synthetic materials, such as long product life and resistance to chemical attack.

These and other purposes of the present invention will become evident from review of the following specification.

SUMMARY OF THE INVENTION

The present invention is an improved composite fiber of polytetrafluoroethylene (PTFE) and fiberglass and a method for producing it. By commingling filaments of fiberglass within filaments of PTFE, a composite fiber is created which has many of the benefits of fiberglass fibers, but with far greater flexibility and resistance to chemicals and abrasion.

In the preferred embodiment of the present invention, the composite fiber is created by combining an expanded PTFE tow yarn and a fiberglass yarn in an air-jet texturing apparatus. By so combining, the filaments of expanded PTFE become intertwined around the filaments of fiberglass so as to form an single strand of strong, flexible composite material. The material can be readily formed into a fabric with a wide range of possible uses, including as a filter media, as an architectural fabric, as a structural fabric (such as when combined with an epoxy resin), etc.

The fiber and fabric of the present invention has numerous advantages over previously available fiberglass materials. For example, the fiber is sufficiently resistant to flex and abrasion that it can be easily handled and worked without compromising its structural integrity. Additionally, the combination of fiberglass and expanded PTFE imparts a number of improved properties to the composite which have previously eluded some synthetic fabrics, including greater temperature and moisture resistance, greater stability and resistance to creep, and reduced cost.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved textile which is a composite of fiberglass filaments and polytetrafluoroethylene (PTFE) filaments.

Figure 2:
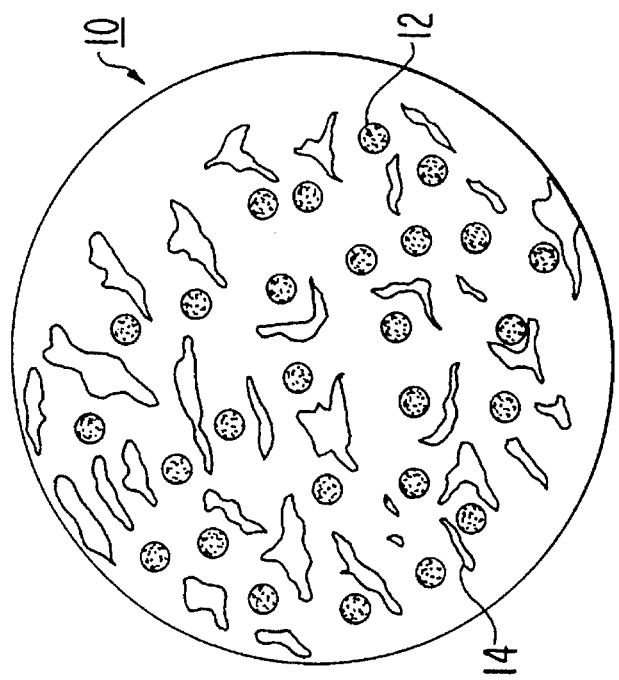
FIG. 2 is an enlarged, partially schematic cross-sectional representation of another embodiment of a fiber of the present invention.
Figure 1:
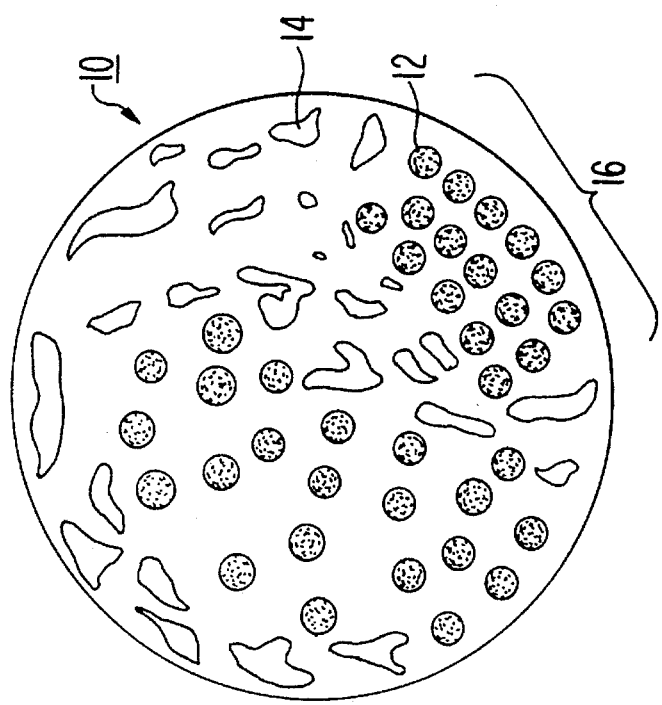
FIG. 1 is an enlarged, partially schematic cross-sectional representation of one embodiment of a fiber of the present invention.

As is illustrated in FIGS. 1 and 2, the fibers 10a, 10b of the present invention comprise filaments of fiberglass 12a, 12b and filaments of PTFE 14a, 14b. The filaments 12, 14 are commingled together to form a cohesive composite thread.

It should be understood that as the term "fiber" is applied herein, it is intended to encompass any strand of composite material made in accordance with the present invention, regardless of application. This is intended to include, without limitation, applications where the fiber is employed as a single thread, as multiple threads braided or otherwise combined together, as a non-woven fabric or membrane material, and as a woven fabric or membrane material.

As is explained in detail below, by varying the parameters used to combine the fiberglass and PTFE filaments, a number of different forms of commingled fibers can be achieved. For example, FIG. 1 shows a fiber 10a wherein clusters 16 of fiberglass filaments 12a tend to remain oriented together, with the PTFE filaments 14a essentially encapsulating the clusters 16. By contrast, the fiber 10b of FIG. 2 has a far more homogenous mix of fiberglass filaments 12b and PTFE filaments 14b, with the fiberglass filaments 12b oriented randomly or fairly evenly throughout the PTFE.

It has been determined that by commingling the filaments of fiberglass and PTFE into a composite fiber of the present invention, a number of unique and desirable properties can be imparted to the fiber. Unlike previous fiberglass fibers, the fibers of the present invention have demonstrated exceptional flex and abrasion resistance. Additionally, these fibers have a lower coefficient of friction and natural lubricity when they rub against each other. They also have unique bulky characteristics, providing variability in the texture of the yarn, including its density and morphology.

Unlike previous fibers constructed from PTFE alone, these fibers have proven to have better thermal stability, to experience less "creep" under standard operating conditions of heat and tension, and to survive temperatures surges which would have shrunk or stretched PTFE.

To create the fiber 10 of the present invention, basically the filaments of PTFE are spread apart into an open lattice and the filaments of fiberglass are then inserted and enclosed within the lattice. Preferably, before or during the insertion process, the fiberglass filaments are bulked, fragmented, and "texturized" into the PTFE lattice.

The process of commingling the fibers is preferably accomplished through use of air-jet texturing apparatus. As is known, textured yarns are those which have been given notably greater apparent volume than a correlational yarn of similar fiber (filament) count and linear density. This is normally accomplished by distorting the shape and/or orientation of the fibers and then setting the fiber (usually through some application of heat) in the distorted orientation. Common procedures in this regard are twisting, heating, crimping, and air jetting.

Air jet apparatus achieves bulk in a yarn by feeding the fibers over high pressure jets of air at a rate faster than they are drawn off. This drives some of the fibers into random loops and provides a substantial amount of bulk. The amount of disarray of the fibers is a function of many parameters, including the amount of tension on the yarn, the speed of the yarn is driven through the apparatus, and the amount of air pressure applied.

Improvements in the basic air jet apparatus has allowed it to be employed to combine two or more types of material into a yarn. Essentially, this process involves: (1) feeding a first material through a series of rollers and the air jet to open up its structure; and (2) simultaneously "overfeeding" a second material to cause it to be drawn into and interlaced within the first material. Again, by adjusting operating parameters (e.g. the relative speed of yarn feed, air jet pressure, relative roller speed, temperature, etc.), a wide variety of yarn textures and types can be produced. Among the products which are created with such an apparatus are single end yarns, multiple end yarns, core and effect yarns, novelty yarns (e.g. with different color mixes), and blended yarns (e.g. filament yarns with staple yarns blended in). One such apparatus is commercially available as a "Model ATM" from HIRSCHBURGER-ELTEX U.S., INC., of Greer, S.C. 29650.

It has been determined that the present invention can be readily constructed by employing such air jet apparatus. By simultaneously feeding PTFE and fiberglass through the air jet, the fiberglass filaments become entrapped within the structure of the PTFE (or visa versa) and form a composite. By adjusting the relative rates of feed, a composite can be readily created as is shown in FIGS. 1 and 2.

It has further been shown that some of the filaments of fiberglass tend to fragment when subjected to the air jet apparatus, thus forming a composite fiber of continuous lengths of PTFE entrapping fragmented filaments of fiberglass. As has been noted, this is believed to produce an even more flexible and abrasion resistant composite fiber than one where care is taken to retain the fiberglass in longer, more coherent strands.

Figure 3:
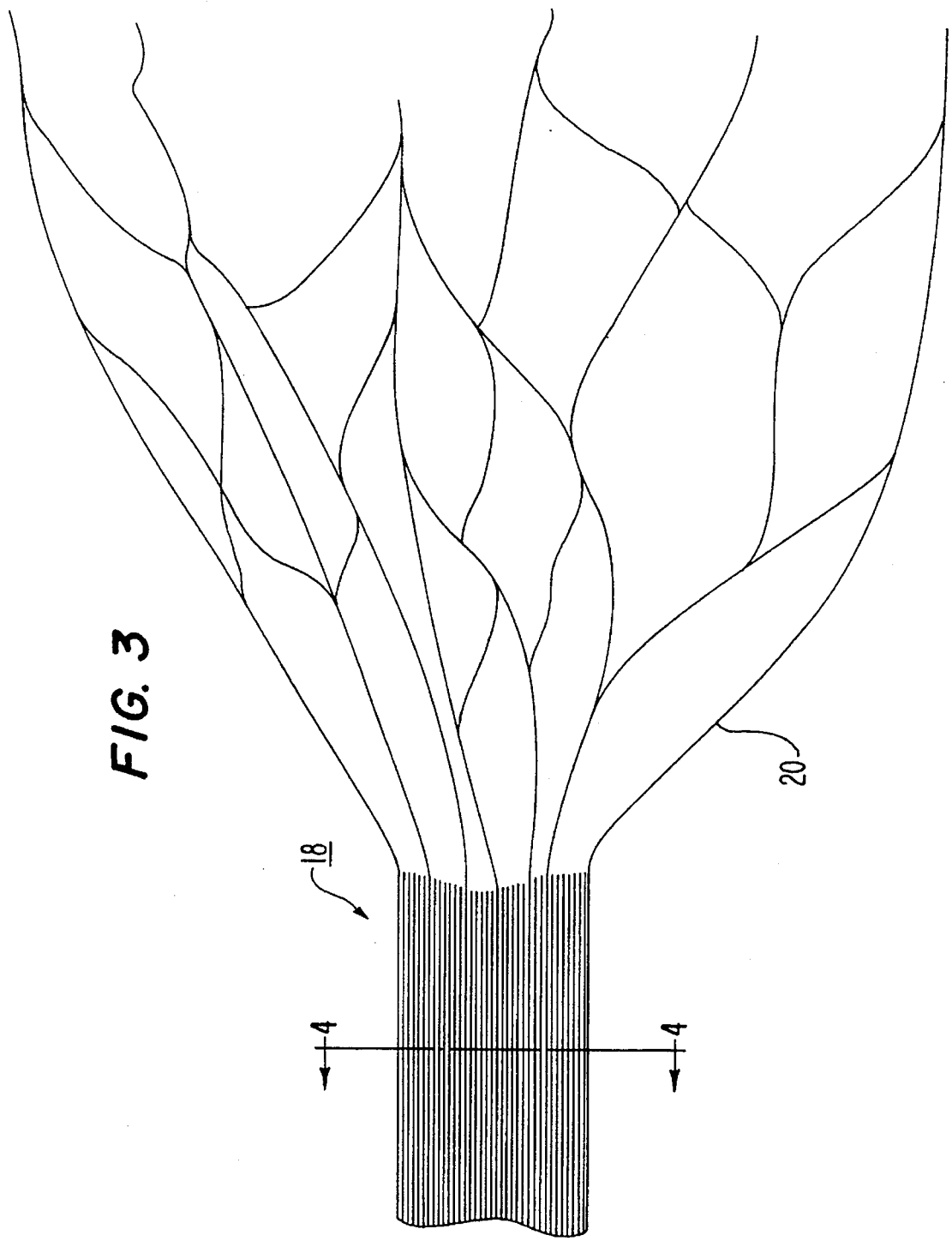
FIG. 3 is an enlarged plan view of a conventional tow yarn formed from expanded polytetrafluoroethylene (PTFE), with its filaments shown in partially exploded orientation.

The processing of the fibers of the present invention may be better understood by referring to the drawings of FIGS. 3–6. In the presently preferred application of the present invention, an expanded PTFE polymer is used. Such a product can be produced in a known manner, such as in accordance with the teachings of U.S. Pat. No. 3,953,566 issued Apr. 27, 1976, to Gore. Ideally, a slit film is created which is then passed over a series of ripper elements (e.g. a pin wheel) in a known manner to form a tow yarn 18. A representation of such a yarn is shown in FIG. 3.

Figure 4:
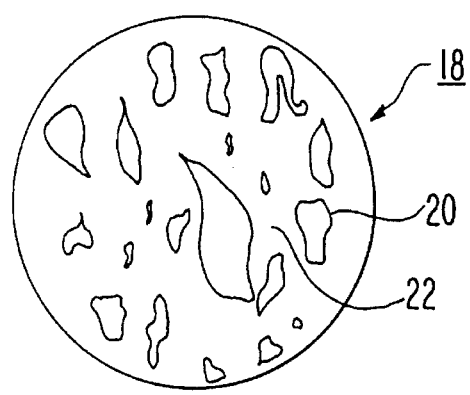
FIG. 4 is a cross-sectional view taken along line 4—4 of FIG. 3.

As is shown in FIG. 3, when created in this manner, the tow yarn 18 can be easily separated to reveal a lattice structure of long randomly interconnected filaments 20 of expanded PTFE. As is shown in FIG. 4, in un-exploded orientation, these filaments 20 are positioned within the PTFE tow yarn defining open spaces 22 between them.

Figure 5:
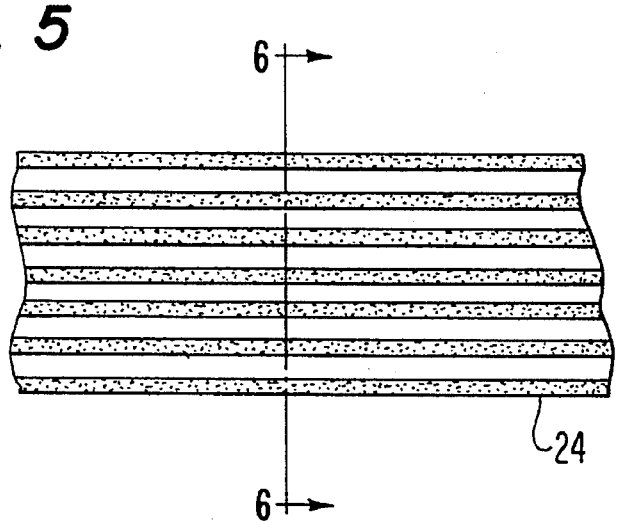
FIG. 5 is a partially schematic representation of a plan view of conventional fiberglass yarn.
Figure 6:
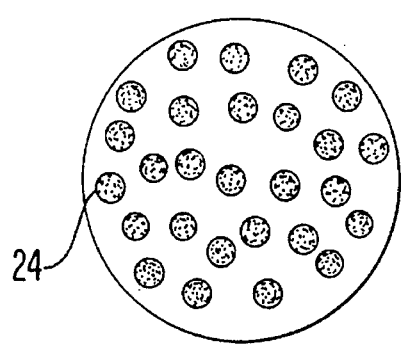
FIG. 6 is a cross-sectional view taken along line 6—6 of FIG. 5.

On the other hand, as is shown in FIGS. 5 and 6, fiberglass filaments 24 are generally arranged in essentially a parallel or spiral arrangement. When subjected to an air-jet texturing apparatus, some of these filaments normally become fragmented into shorter strands.

The fiberglass and PTFE can be mixed in various proportions to impart different properties to the composite thread. Generally, the composite fiber should contain 10 to 75% by weight of PTFE and 25 to 90% by weight of fiberglass. These proportions are a function of the mechanical properties required for a given application, with relatively more PTFE included to provide greater flex fatigue and abrasion resistance. For most applications, proportions of 25 to 50% by weight of PTFE and 50 to 75% by weight fiberglass are preferred.

In addition, for some applications it may be desirable to include one or more fillers to provide additional or enhanced properties for the composite fiber. Appropriate fillers include conductive fillers, such as graphite, carbon black or metal oxide, to produce an electrically conductive fiber; metal oxide or organic pigments to create colors for aesthetic or other reasons; and/or thermoplastic thermoset resins to create structural composites. Such fillers can be coated onto the composite fiber and/or incorporated into the PTFE fiber itself, such as through procedures similar to those disclosed in U.S. Pat. No. 4,985,296 issued Jan. 15, 1991, to Mortimer, Jr.

The fibers created in accordance with the present invention can be readily used to create fabrics with a wide assortment of uses. This can be accomplished through any conventional procedures to create a woven, non-woven, braided or ribbon material.

Preferably, the fabric is woven on conventional weaving looms to produce a woven fabric. The resulting fabric can be scoured with a surfactant and water solution or heat cleaned using a high temperature bake cycle to remove any residual sizing. Additional chemical finishes can then be applied to the composite fabric to impart chemical resistance or other desired properties. One of the more promising applications of the present invention in this regard is to create woven fabrics for use as filter media.

Figure 7:
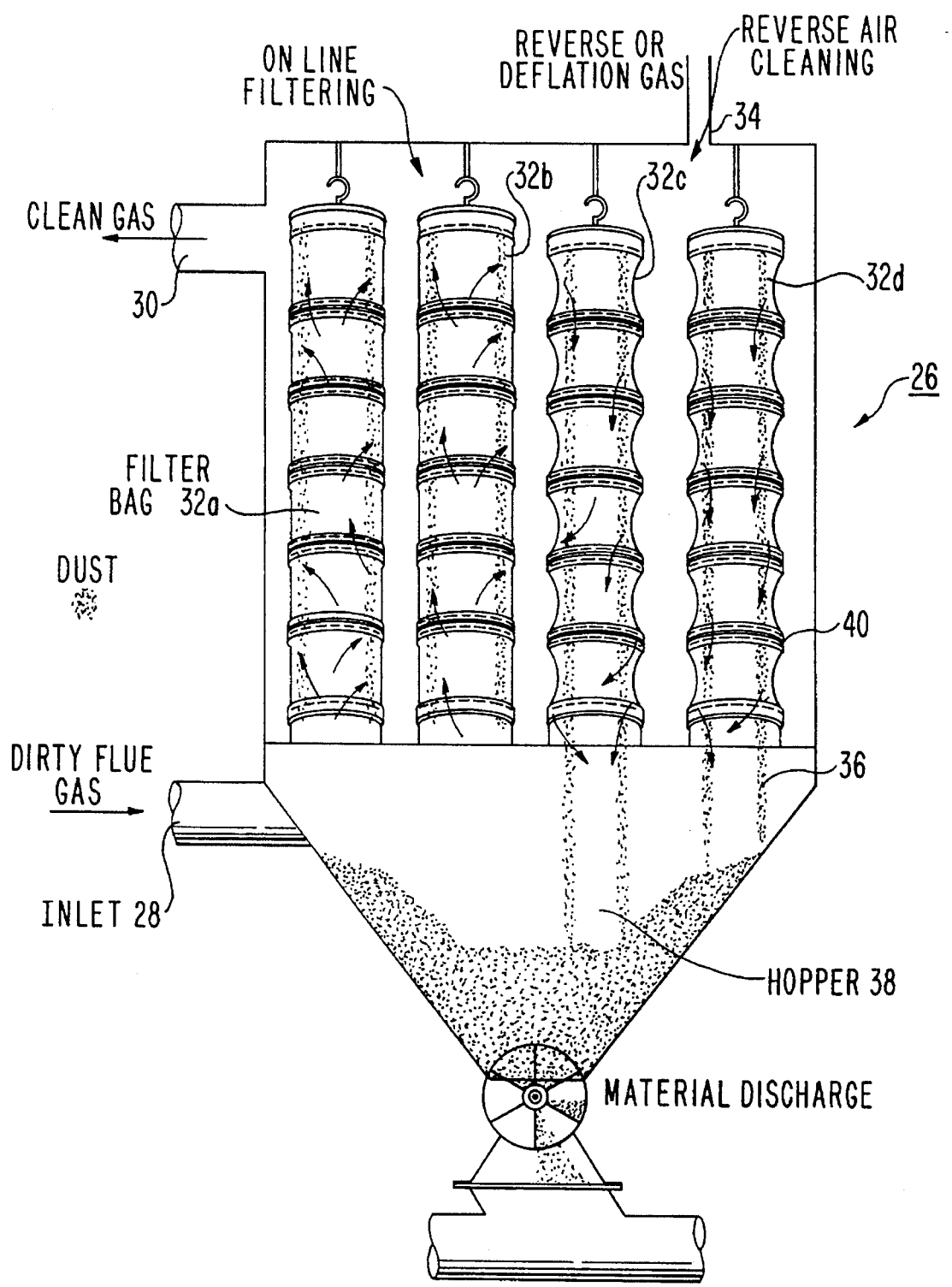
FIG. 7 is a schematic representation of a reverse-air filter bag house employing filter bags constructed from fabric of the present invention.

Shown in FIG. 7 is a representation of a reverse air filter bag house 26. Such industrial filter units employ an inlet 28 for dirty flue gases, an outlet 30 for clean flue gases, and one or more filter bags 32a, 32b, 32c, 32d in communication between the inlet and the outlet to trap particulate matter. In order to regenerate the filter bags 32 when they become internally encrusted with "dust cake" or "secondary cake," a reverse air inlet 34 is provided for imparting a pressure onto the outside of the filter bags 32.

As is shown with respect to bags 32c, 32d, when reverse air pressure is applied, the fabric of the bags becomes distorted inward. The combination of reverse air flow and the inward distortion of the bags tends to dislodge particulate 36 into a hopper 38 where it can be removed. Ribs or rings 40 are normally applied in this context to help retain the overall shape of the bags 32 during reverse air flow.

Although fiberglass bags are commonly employed in this environment, the stresses caused by the reverse air flow weaken the filter bags at the areas of flex between the rings 40. Due to the brittle nature of fiberglass, this results in relatively rapid bag deterioration when compared to bags made from more flexible synthetic materials. Through the use of filter bags 32a, 32b, 32c, 32d constructed from a woven fabric of the present invention, the life of such filter bags can be dramatically increased. It is believed that bag life can be increased on the order of 2 to 10 times in this manner.

Figure 8:
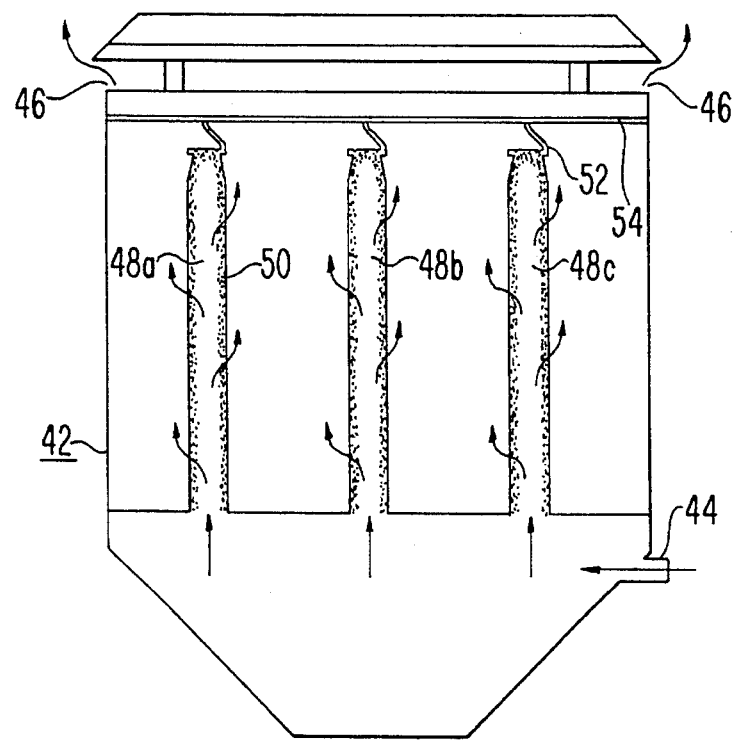
FIG. 8 is a schematic representation of a shaker-type filter bag house employing filter bags constructed from fabric of the present invention.
Figure 9:
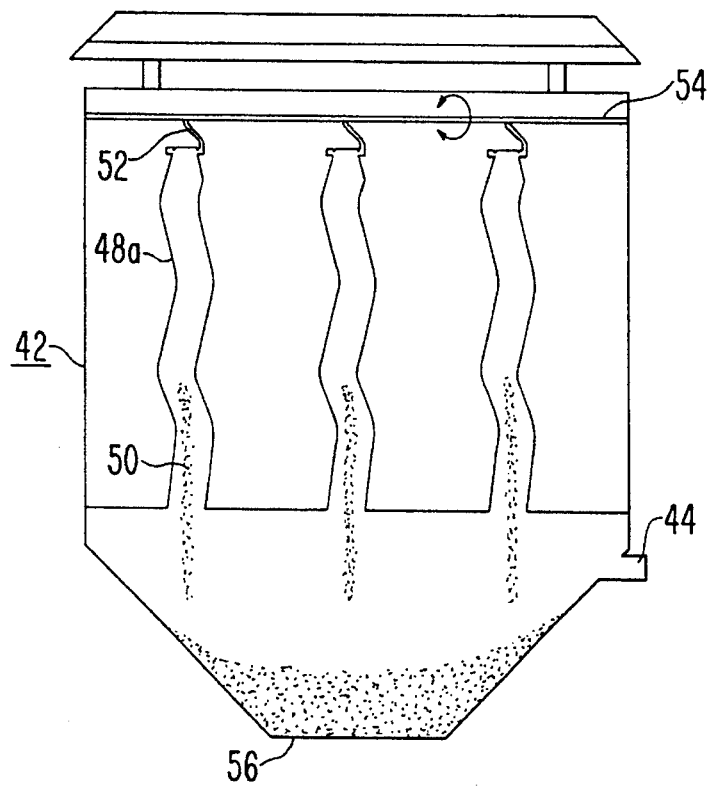
FIG. 9 is a schematic representation of the shaker bag house of FIG. 8, showing the filter bags being cleaned.

Further, the fiber flexibility imparted by the present invention permits use of fiberglass bags in far more demanding filter applications, such as "shaker" type and pulse-jet type filter bags. As is shown in FIGS. 8 and 9, a conventional shaker filter bag house 42 has an inlet 44 for dirty flue gases, one or more outlets 46 for clean flue gases, and one or more filter bags 48a, 48b, 48c in communication between the inlet 44 and the outlet 46 for trapping particulate matter 50. Similar in scrubbing operation to the reverse air bag house, during operation the insides of the shaker bag filters 48 become encrusted with secondary cake as shown.

In order to regenerate the filter media, each of the filter bags 48 is attached to a rocker arm 52 actuated by rotating shaft 54 or similar device which "shake" the bags to free particulate. The shaking procedure is illustrated in FIG. 9. When the bags are distorted in this manner, particulate 50 will fall into a hopper 56 where it can be removed.

It should be evident from the previous discussion of the fragile nature of fiberglass bags that they simply are unable to withstand the vigorous shaking of this environment without undergoing serious fatigue and early failure. By contrast, bags 48a, 48b, 48c of the present invention can easily withstand such treatment without failure or loss of effectiveness.

Additionally, the fabric of the present invention lends itself to many further improvements in filter environments. For example, a composite fabric of the present invention can be combined with other filter coatings (e.g. an expanded PTFE filter membrane) to provide improved filtration characteristics. The strong yet flexible nature of the fiber of the present invention is believed to be able to create a superior filter in this regard.

Further, by employing conductive filled PTFE tow yarns, it is possible to dissipate static charges created by triboelectrically dissimilar materials rubbing against each other (e.g. dust rubbing against the filter bag surface). Furthermore, a variety of other improved filter properties are believed possible through use of the present invention. For example, flexible release belts can be improved by weaving a textile using the fiber of the invention. By coating such belts with TEFLON B dispersion or similar material, an improved release belt surface can be provided for cooking or sealing operations.

The fiber and fabric of the present invention has numerous other possible applications. For instance, it can be employed as an improved sewing thread, belting, architectural fabric, in printed circuit boards, as a structural composite, in roofing material, as insulation material, etc.

Without intending to limit the scope of the present invention, the nature and operation of the present invention can be better understood when considered in light of the following example.

EXAMPLE

A 1200 denier expanded PTFE monofilament slit film fiber was towed in a correlational manner using a pinwheel. A fiberglass yarn with the description ECDE 75 2/0, commercially available from Owens Corning Fiberglass or PPG Industries, was employed to combine with the PTFE.

The two yarns in equal proportions (50:50) were twisted together at 2.8 turns per inch in the S direction. The twisted yarn was then run through a HIRSCHBURGER-ELTEX Air Texturing machine, Model ATM, to intimately blend or commingle the fibers. Once commingled, it was impossible to separate the component yarns without destroying them. The yarn now had a "fuzzy" appearance.

The following table is a physical property comparison of the commingled yarn to a conventional fiberglass yarn.

| Fill Yarn Type | Conventional Yarn | Composite Yarn |
| --- | --- | --- |
| Description | ECDE 75 1/4 Tex | ECDE 75 2/0 + PTFE |
| Denier | 2400 | 2400 |
| Break Strength (lbs.) | 4.84 | 14.7 |
| M.I.T. Flex Cycles to Failure | 8 | 1408 |
| Yarn Abrasion Cycles to Failure | 0 | 188 |

The "M.I.T. Flex Cycles" test comprises an apparatus which double folds the fiber over a straightedge in either direction over a 270° range until failure occurs. The "Yarn Abrasion Cycles" test comprises fixing two similar yarns in brackets and then rubbing the yarn on itself until failure occurs. A cycle is one complete stroke which includes forward and return movements. The conventional fiberglass yarn tested was incapable of completing one cycle.

The above fiber was woven on a conventional weaving loom to produce a 22 oz./yd$^2$ greige fabric. The greige fabric had the following properties: thread count of 48×40 threads per inch; thickness of 0.034 inches; and break strength (W×F) of 570×323 lbs./inch grab.

The greige fabric was scoured with a hot water and surfactant solution to remove starches and weaving aids. It was then coated with TEFLON B dispersion and cured in a convection oven. The fabric was baked at 500° F. overnight to heat set the fabric and bake off any residual surfactants from the coating process.

For use of this fiber as a filtration fiber, the demands of filtration application require improved flex fatigue resistance in the filling direction only. As such, the fibers of the present invention need only be applied in that direction.

The fabric so constructed was then tested for physical properties and found to possess the following as compared to conventional fiberglass filtration media:

| CHARACTERISTIC | CONVENTIONAL FABRIC | COMPOSITE FABRIC |
| --- | --- | --- |
| Warp Yarn | ECDE 75 1/2 | ECDE 75 1/2 |
| Fill Yarn | ECDE 75 1/4 TEX | 2 ENDS ECDE 75 1/0 1 END 1200 DENIER PTFE |
| Weight (Oz/Yd$^2$) | 24.0 | 23.7 |
| Thickness (inches) | 0.034 | 0.040 |
| Permeability | 60 | 46 |
| Thread Count | 47 × 40 | 48 × 40 |
| Break Strength | 500 × 400 | 510 × 445 |
| M.I.T. Flex Endurance | 50,000 × 7000 | 50,000 × 1,000,000 |
| Water Drop Resistance | OK | OK |

The composite fabric was tested for filtration efficiency and found to have significantly better capture efficiency than conventional fiberglass fabrics. The composite fabric was also successfully laminated with a microporous PTFE membrane. This fabric is expected to provide superior performance during field testing.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A fabric which comprises multiple filaments of expanded polytetrafluoroethylene (PTFE);

multiple filaments of fiberglass, some of the fiberglass comprising fiberglass fragments;

wherein the filaments of expanded PTFE and fiberglass form a single strand fiber of commingled filaments having the filaments of fiberglass textured within the expanded PTFE filaments; and wherein the fabric is formed by the combination of multiple strands of the fibers.

2. The fabric of claim 1 wherein the fabric comprises a weave of multiple composite fibers.

3. The fabric of claim 2 wherein the fabric can withstand repeated double folds without tearing.

4. The fabric of claim 2 wherein the fabric comprises a filter.

5. The fabric of claim 4 wherein the filter comprises a bag filter.

\* \* \* \* \*